(12) United States Patent  (10) Patent No.: US 9,114,766 B1
Pelini                     (45) Date of Patent:     Aug. 25, 2015

(54) HEADREST CAMERA MOUNTING DEVICE

(71) Applicant: Mark F. Pelini, Valrico, FL (US)

(72) Inventor: Mark F. Pelini, Valrico, FL (US)

(*) Notice: Subject to any disclaimer, the term of this patent is extended or adjusted under 35 U.S.C. 154(b) by 0 days.

(21) Appl. No.: 14/447,801

(22) Filed: Jul. 31, 2014

(51) Int. Cl.
A47B 96/06     (2006.01)
B60R 11/04     (2006.01)
A47C 7/72      (2006.01)
G03B 17/00     (2006.01)
F16M 11/04     (2006.01)
B60R 11/00     (2006.01)

(52) U.S. Cl.
CPC . B60R 11/04 (2013.01); A47C 7/72 (2013.01); F16M 11/04 (2013.01); G03B 17/00 (2013.01); B60R 2011/0017 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,306,790 A * | 12/1981 | Adams | | 396/425 |
| 4,514,067 A * | 4/1985 | Gallegos | | 396/425 |
| 5,260,731 A * | 11/1993 | Baker, Jr. | | 396/428 |
| 5,833,101 A * | 11/1998 | Watkins | | 224/275 |
| 6,019,326 A * | 2/2000 | Baerwolf et al. | | 248/177.1 |
| 6,116,485 A * | 9/2000 | Watkins | | 224/275 |
| 6,231,017 B1 * | 5/2001 | Watkins | | 248/274.1 |
| 6,315,180 B1 * | 11/2001 | Watkins | | 224/275 |
| 6,445,408 B1 * | 9/2002 | Watkins | | 348/148 |
| 6,705,578 B2 * | 3/2004 | Mulford et al. | | 248/187.1 |
| 7,201,443 B2 * | 4/2007 | Cilluffo et al. | | 297/188.06 |
| 7,364,230 B2 * | 4/2008 | Zheng | | 297/188.2 |
| 7,654,425 B2 * | 2/2010 | Huang et al. | | 224/483 |
| 7,784,864 B2 * | 8/2010 | Feder | | 297/188.06 |
| 7,862,112 B2 * | 1/2011 | Caturla et al. | | 297/163 |
| 8,136,777 B2 * | 3/2012 | Brawner | | 248/309.1 |
| 8,678,680 B1 | 3/2014 | Pelini | | |
| 8,733,831 B2 * | 5/2014 | Brawner | | 297/188.05 |
| D707,747 S | 6/2014 | Pelini | | |
| 8,864,226 B2 * | 10/2014 | Fan | | 297/188.05 |
| 2002/0175254 A1 * | 11/2002 | Lee | | 248/289.11 |
| 2006/0032996 A1 * | 2/2006 | Wu | | 248/218.4 |
| 2008/0205877 A1 * | 8/2008 | Stanev et al. | | 396/428 |
| 2008/0240705 A1 * | 10/2008 | Nazarian | | 396/420 |
| 2014/0197218 A1 * | 7/2014 | Jordan et al. | | 224/545 |

* cited by examiner

Primary Examiner — Monica Millner
(74) Attorney, Agent, or Firm — Edward P Dutkiewicz

(57) ABSTRACT

A headrest camera mounting device comprising a primary arm having a plurality of coupling bolt holes there through. There is a mounting block having a pair of threaded slide locking bolt holes there in. There is a secondary arm. The mounting block is held between the primary arm and the secondary arm. The mounting block allows for a slidable adjustment to accept a multitude of configurations of head rest supports.

9 Claims, 3 Drawing Sheets

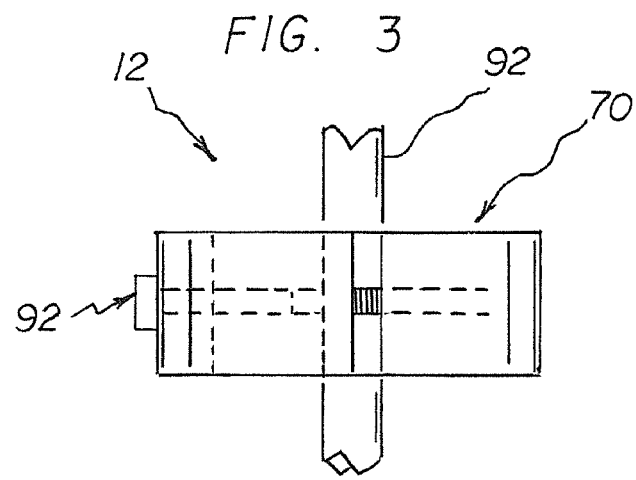
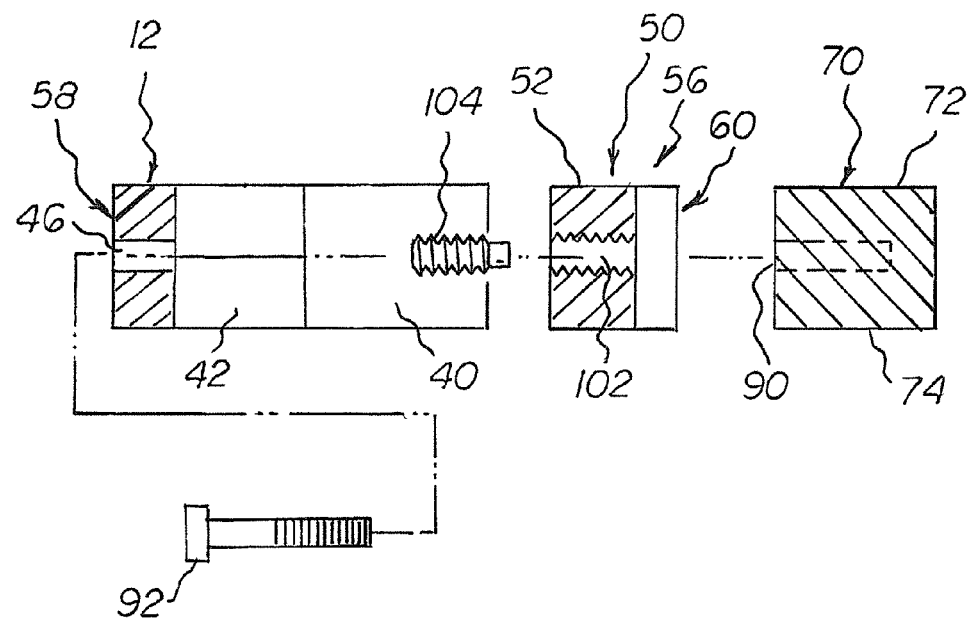

HEADREST CAMERA MOUNTING DEVICE

BACKGROUND OF THE INVENTION

The Applicant has not submitted a related pending or patented non-provisional application within two months of the filing date of this present application. The invention is made by a single inventor, so there are no other inventors to be disclosed. This application is not under assignment to any other person or entity at this time.

FIELD OF THE INVENTION

The present invention relates to a headrest camera mounting device and more particularly pertains to a device for mounting a camera to a seat headrest.

DESCRIPTION OF THE PRIOR ART

The use of a mounting device to attach an article to various surfaces is known in the prior art. More specifically, a mounting device to attach an article to various surfaces previously devised and utilized for the purpose of mounting a device to a surface are known to consist basically of familiar, expected, and obvious structural configurations, notwithstanding the designs encompassed by the prior art which have been developed for the fulfillment of various objectives and requirements.

While the prior art devices fulfill their respective, particular objectives and requirements, the prior art does not describe headrest camera mounting device that teaches the mounting device for mounting a camera to a seat headrest.

In this respect, the headrest camera mounting device, according to the present invention, substantially departs from the conventional concepts and designs of the prior art, and in doing so provides an apparatus primarily developed for the purpose mounting a camera to a seat headrest.

Therefore, it can be appreciated that there exists a continuing need for a new and improved headrest camera mounting device which can be used mounting a camera to a seat headrest. In this regard, the present invention substantially fulfills this need.

SUMMARY OF THE INVENTION

In view of the foregoing disadvantages inherent in the known types of a mounting device to attach an article to various surfaces now present in the prior art, the present invention provides an improved headrest camera mounting device. As such, the general purpose of the present invention, which will be described subsequently in greater detail, is to provide a new and improved headrest camera mounting device which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

By adjacent to a structure is meant that the location is near the identified structure. Adjacent may be interpreted to mean along side of, or near.

The term "oppositely located" means that the structure or item is located on two sides of another location or structure, with the locations being generally about the same distance from a location and structure and the general appearance being that the oppositely located structure or item is generally substantially similar.

To attain this, the present invention essentially comprises a headrest camera mounting device comprising several components, in combination.

There is a primary arm. The primary arm is fabricated of a rigid material. The primary arm has a first length, a first thickness, and a first height. The length of the primary arm has a generally centrally located central region. The primary arm of the headrest camera mounting has an upper surface, a lower surface, and an edge there between. The edge is formed by the thickness of the primary arm, being a continuous front edge, rear edge, and opposing end edges. The opposing end edges being a first end edge and a second end edge. The primary arm has a camera mounting end and a headrest attachment end, with the attachment end having a terminus formed by the first end edge.

The camera mounting end has a generally rectilinear configuration, with a rounded terminus. The rounded terminus forms the edge, with the edge having the first thickness. The camera mounting end of the primary end of the headrest camera mounting has a camera coupling subassembly mounting bolt hole there through for receiving a camera coupling subassembly. The camera coupling subassembly mounting bolt hole runs from the upper surface of the primary arm to the lower surface of the primary arm.

The primary arm has a first recess and a second recess therein. The first recess runs from the central region of the primary arm to the terminus of the headrest attachment end of the primary arm. The second recess is made in the first recess of the primary arm. The second recess has a rectilinear configuration.

The primary arm has a plurality of coupling bolt holes there through. The coupling bolt holes run from the front edge of the primary arm, through the primary arm to the first recess. The primary arm has a slot therein. The slot runs from the front edge of the primary arm, through the primary arm to the second recess.

The headrest attachment end of the primary arm has a third recess. The third recess has a V-shaped configuration. "V-shaped" means that the recess has two sides which intersect. In the preferred embodiment there is a radius made between the two intersecting sides of the V-shaped recess. The third recess is located adjacent the terminus of the headrest attachment end.

There is a mounting block. The mounting block is fabricated of a rigid material. The mounting block has a top surface, a bottom surface, a rear edge, a front edge, and a pair of generally parallel side edges. The rear edge of the mounting block has a fourth recess. The fourth recess has a V-shaped configuration.

The mounting block front edge has a pair of threaded slide locking bolt holes there in. Each of the threaded slide locking bolt holes has an associated slide locking bolt. Each slide locking bolt has a threaded shaft and a head. Each slide locking bolt is configured to allow the shaft to pass through the slot of the primary arm, with the shaft being threadedly received by the threaded bolt holes of the mounting block, thereby securing the mounting block within the second recess.

Lastly, there is a secondary arm. The secondary arm is fabricated of a rigid material. The secondary arm has a second length, a second thickness, and a first height. The secondary arm has an upper surface, a lower surface, and an edge there between. The edge is formed by the thickness of the secondary arm, that being a continuous front edge, rear edge, and opposing end edges, the opposing side edges being a first end edge and a second end edge.

The secondary arm has a central end and a headrest attachment end, with the attachment end having a terminus formed by the first end edge of the secondary arm. The secondary arm is configured to fit into, and mate with, the first recess of the primary arm. The central end of the secondary arm has a generally angled configuration, with an angled terminus. By "angled terminus" is meant that the terminus is formed by two intersecting planes, having an angle there between, such as a corner.

The camera mounting end of the primary end of the headrest camera mounting has a camera coupling subassembly mounting bolt hole there through for receiving a camera coupling subassembly. The front edge of the secondary arm has a plurality of threaded coupling bolt holes therein. Each of the secondary arm front edge coupling bolt holes has an associated coupling bolt. The coupling bolts secure the primary arm and the secondary arm together. The mounting block is held within the third recess, between the primary arm and the secondary arm.

Lastly, there is a camera and a camera pivot mount. The pivot mount has a pivot mount pin. The pin has a generally rounded configuration, with a pair of flanges. The pivot mount pin has an upper end portion with a hemispherical recess therein. The pivot mount base also has a sleeve component. The sleeve component of the pivot mount has a generally hollow tubular cylindrical configuration, with a lower portion and an upper portion. The lower portion of the pivot mount has a retaining pin threaded hole, with an associated threaded pin. The lower portion of the pivot mount also has a threaded locking bolt hole therein. The threaded locking bolt hole of the lower portion of the pivot mount has an associated locking bolt. The pivot mount also has an articulating camera mounting stud having a generally rounded end, with the generally rounded end being nested within the upper portion of the pivot mount. The camera mounting stud has a locking collar associated therewith.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved headrest camera mounting device which has all of the advantages of the prior art a mounting device to attach an article to various surfaces and none of the disadvantages.

It is another object of the present invention to provide a new and improved headrest camera mounting device which may be easily and efficiently manufactured and marketed.

It is further object of the present invention to provide a new and improved headrest camera mounting device which is of durable and reliable constructions.

An even further object of the present invention is to provide a new and improved headrest camera mounting device which is susceptible of a low cost of manufacture with regard to both materials and labor, and which accordingly is then susceptible of low prices of sale to the consuming public, thereby making such headrest camera mounting device economically available to the buying public.

Even still another object of the present invention is to provide a headrest camera mounting device for a device for mounting a camera to a seat headrest.

Lastly, it is an object of the present invention to provide a new and improved headrest camera mounting comprising a primary arm having a plurality of coupling bolt holes there through. There is a mounting block having a pair of threaded slide locking bolt holes there in. There is a secondary arm. The mounting block is held between the primary arm and the secondary arm. The mounting block allows for a slidable adjustment to accept a multitude of configurations of head rest supports.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a view taken along line 3-3 of FIG. 1.

FIG. 4 is a view taken along line 4-4 of FIG. 1.

The same reference numerals refer to the same parts throughout the various Figures.

DESCRIPTION OF THE PREFERRED EMBODIMENT

Figure 1:
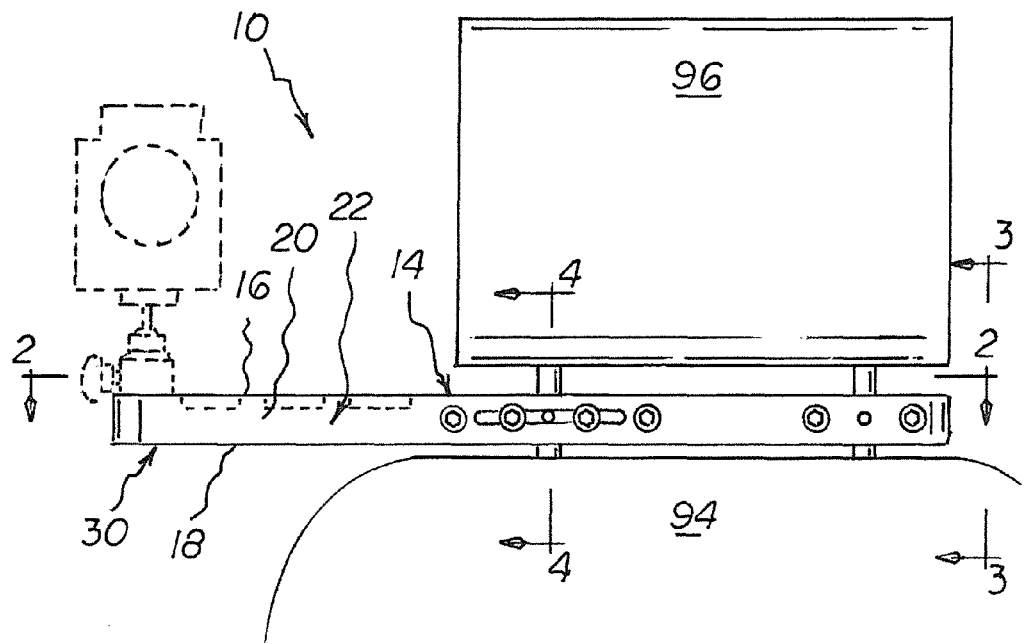
FIG. 1 is front elevational view of the device installed on an existing automobile seat which has a headrest.
Figure 2:
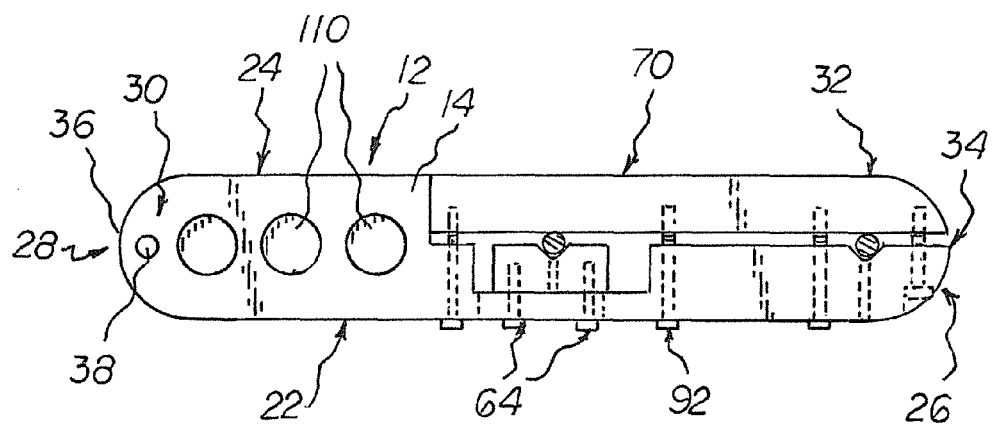
FIG. 2 is a view taken along line 2-2 of FIG. 1.
Figure 5:
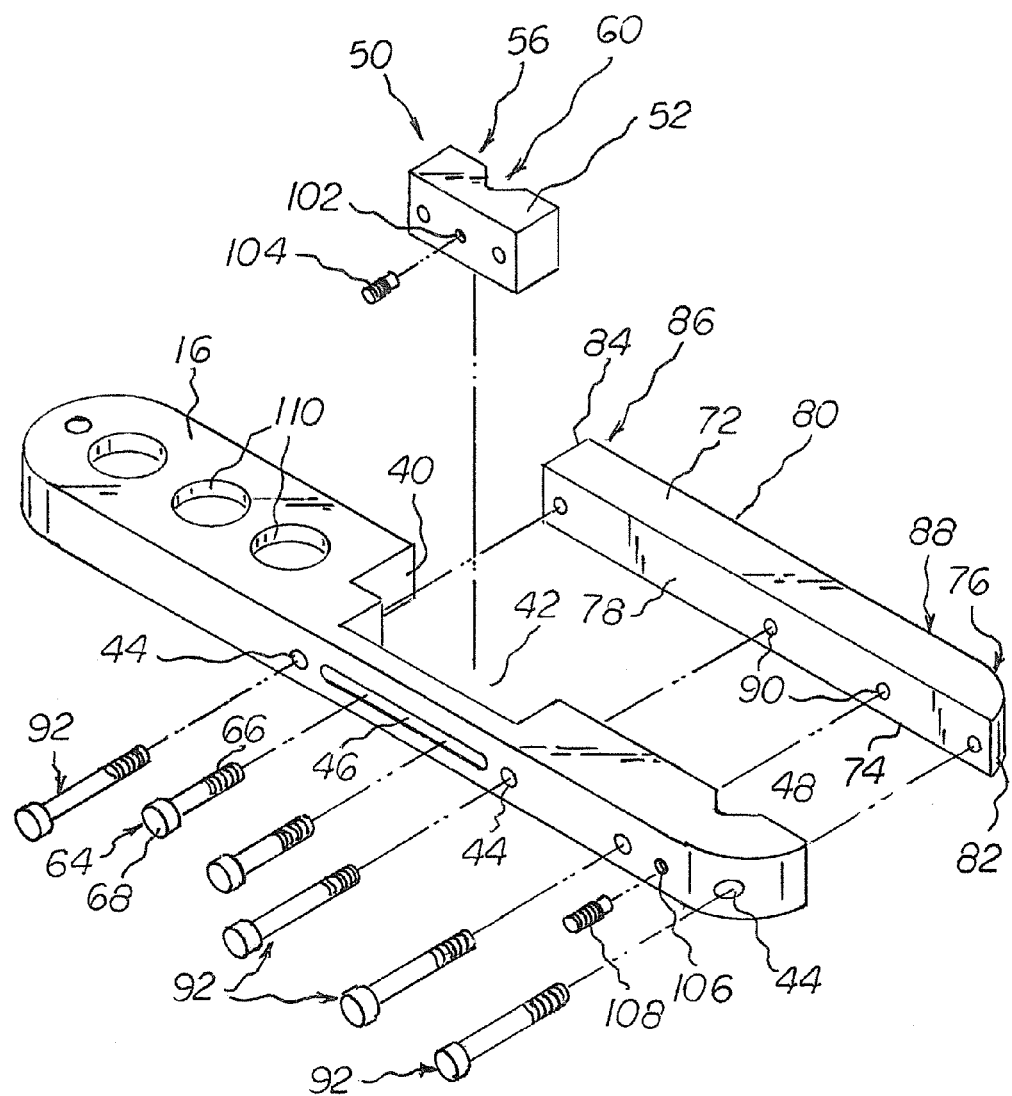
FIG. 5 is an exploded perspective view of the device.

With reference now to the drawings, and in particular to FIG. 1 thereof, the preferred embodiment of the new and improved headrest camera mounting device embodying the principles and concepts of the present invention and generally designated by the reference numeral 10 will be described.

The present invention, the headrest camera mounting device 10 is comprised of a plurality of components. Such components in their broadest context include a long member, a short member, and a pivot mounting. Such components are individually configured and correlated with respect to each other so as to attain the desired objective.

A headrest camera mounting device 10, comprising several components, in combination.

There is a primary arm 12. The primary arm is fabricated of a rigid material. The primary arm has a first length, a first thickness, and a first height. The length of the primary arm has a generally centrally located central region 14. The primary arm of the headrest camera mounting has an upper surface 16, a lower surface 18, and an edge 20 there between. The edge is formed by the thickness of the primary arm, being a continuous front edge 22, rear edge 24, and opposing end edges. The opposing end edges being a first end edge 26 and a second end edge 28. The primary arm has a camera mounting end 30 and a headrest attachment end 32, with the attachment end having a terminus 34 formed by the first end edge.

The camera mounting end has a generally rectilinear configuration, with a rounded terminus 36. The rounded terminus forms the edge, with the edge having the first thickness. The camera mounting end of the primary end of the headrest camera mounting has a camera coupling subassembly mounting bolt hole 38 there through for receiving a camera coupling subassembly. The camera coupling subassembly mounting bolt hole runs from the upper surface of the primary arm to the lower surface of the primary arm.

The primary arm has a first recess 40 and a second recess 42 therein. The first recess runs from the central region of the primary arm to the terminus of the headrest attachment end of the primary arm. The second recess is made in the first recess of the primary arm. The second recess has a rectilinear configuration.

The primary arm has a plurality of coupling bolt holes 44 there through. The coupling bolt holes run from the front edge of the primary arm, through the primary arm to the first recess. The primary arm has a slot 46 therein. The slot runs from the front edge of the primary arm, through the primary arm to the second recess.

The headrest attachment end of the primary arm has a third recess 48. The third recess has a V-shaped configuration. The third recess is located adjacent the terminus of the headrest attachment end.

There is a mounting block 50. The mounting block is fabricated of a rigid material. The mounting block has a top surface 52, a bottom surface 54, a rear edge 56, a front edge 58, and a pair of generally parallel side edges. The rear edge of the mounting block has a fourth recess 60. The fourth recess has a V-shaped configuration.

The mounting block front edge has a pair of threaded slide locking bolt holes 62 there in. Each of the threaded slide locking bolt holes has an associated slide locking bolt 64. Each slide locking bolt has a threaded shaft 66 and a head 68. Each slide locking bolt is configured to allow the shaft to pass through the slot of the primary arm, with the shaft being threadedly received by the threaded bolt holes of the mounting block, thereby securing the mounting block within the second recess.

There is a secondary arm 70. The secondary arm is fabricated of a rigid material. The secondary arm has a second length, a second thickness, and a first height. The secondary arm has an upper surface 72, a lower surface 74, and an edge 76 there between. The edge is formed by the thickness of the secondary arm, that being a continuous front edge 78, rear edge 80, and opposing end edges, the opposing side edges being a first end edge 82 and a second end edge 84.

The secondary arm has a central end 86 and a headrest attachment end 88, with the attachment end having a terminus formed by the first end edge of the secondary arm. The secondary arm is configured to fit into, and mate with, the first recess of the primary arm. The central end of the secondary arm has a generally angled configuration, with an angled terminus. By "angled terminus" is meant that the terminus is formed by two intersecting planes, having an angle there between, such as a corner.

The front edge of the secondary arm has a plurality of threaded coupling bolt holes 90 therein. Each of the secondary arm front edge coupling bolt holes has an associated coupling bolt 92. The coupling bolts secure the primary arm and the secondary arm together. The mounting block is held within the third recess, between the primary arm and the secondary arm.

Lastly, there is a camera and a pivot mount. The pivot mounting has a pivot mounting pin. The pin has a generally rounded configuration, with a pair of flanges. The pivot mount pin has an upper end portion with a hemispherical recess therein. The pivot mount base also has a sleeve component. The sleeve component of the pivot mount has a generally hollow tubular cylindrical configuration, with a lower portion and an upper portion. The lower portion of the pivot mounting has a retaining pin threaded hole, with an associated threaded pin. The lower portion of the pivot mounting also has a threaded locking bolt hole therein. The threaded locking bolt hole of the lower portion of the pivot mounting has an associated locking bolt. The pivot mounting also has an articulating camera mounting stud having a generally rounded end, with the generally rounded end being nested within the upper portion of the pivoting mounting. The camera mounting stud has a locking collar associated therewith.

In use, the primary arm and secondary arm are removed from one another. This splits the device. The mounting block bolts are then loosened, so as to allow the sliding of the mounting block within the second recess. The headrest camera mounting primary arm is then held to an existing headrest of a vehicle, to which the user wishes to attach a camera. The headrest has a pair of supports which run between the headrest and a seat top. The third recess is aligned with one of the headrest supports, and the mounting block is moved to receive the other headrest support within the fourth recess, that being the recess of the mounting block. With the headrest supports within the third and fourth recesses, the secondary arm is then re-attached to the primary arm, using the bolts to hold the two arms together. The locking bolts of the mounting block are tightened, and the bolts holding the primary and secondary arms together are finally tightened. A camera is attached using a camera mounting.

In use, the invention provided an advantage to those users who wish to affix an in vehicle camera to an existing auto seat 94 headrest 96. Not all headrests are easily removed for inserting the headrest supports through a bracket. With the present invention, the headrest camera mounting device has two components, a primary arm and a secondary arm, which are coupled by a plurality of bolts.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A headrest camera mount comprising several components, in combination:
a primary arm having a first length and a first thickness and a first height, the length of the primary arm having a generally centrally located central region, the primary arm of the headrest camera mount having an upper surface and a lower surface and an edge there between, the primary arm has a camera mount end and a headrest attachment end, the primary arm having a plurality of coupling bolt holes there through;
the camera mount end of the primary arm of the headrest camera mount having a camera coupling subassembly mounting bolt hole there through for receiving a camera coupling subassembly;
the primary arm having a first recess and a second recess therein, the first recess running from the central region of the primary arm to the terminus of the headrest attachment end of the primary arm, the second recess being made in the first recess of the primary arm, the second recess having a rectilinear configuration;
a mounting block having a top surface and a bottom surface and a rear edge and a front edge, the mounting block front edge having a pair of threaded slide locking bolt holes there in, with each of the threaded slide locking bolt holes having an associated slide locking bolt, the mounting block a pair of generally parallel side edges with the rear edge of the mounting block having a fourth recess; and
a secondary arm having a second length and a second thickness and a first height, the secondary arm having an upper surface and a lower surface and an edge there between, the secondary arm having a central end and a headrest attachment end with the attachment end having a terminus formed by the first end edge of the secondary arm.

2. The headrest camera mount as described in claim 1, with the headrest camera mount further comprising:
the primary arm having a slot therein, the slot running from the front edge of the primary arm and through the primary arm to the second recess;
the primary arm camera coupling subassembly mounting bolt hole running from the upper surface of the primary arm to the lower surface of the primary arm; and
the secondary arm being configured to fit into and mate with the first recess of the primary arm, the central end of the secondary arm having a generally angled configuration with an angled terminus.

3. The headrest camera mount as described in claim 2, with the headrest camera mount further comprising:
the primary arm edge being formed by the thickness of the primary arm being a continuous front edge and rear edge and opposing end edges being a first end edge and a second end edge;
the primary arm coupling bolt holes running from the front edge of the primary arm and through the primary arm to the first recess;
the mounting block fourth recess having a V-shaped configuration; and
the secondary arm side edge being formed by the thickness of the secondary arm, the edge being a continuous with the front edge and rear edge and opposing end edges, the side edges of the secondary arm being a first end edge and a second end edge.

4. The headrest camera mount as described in claim 3, with the headrest camera mount further comprising:
the primary arm attachment end having a terminus formed by the first end edge; and
the front edge of the secondary arm having a plurality of threaded coupling bolt holes therein.

5. The headrest camera mount as described in claim 4, with the headrest camera mount further comprising:
the primary arm camera mount end having a generally rectilinear configuration with a rounded terminus, the rounded terminus forming the edge having the first thickness; and
each of the secondary arm front edge coupling bolt holes having an associated coupling bolt.

6. The headrest camera mount as described in claim 5, with the headrest camera mount further comprising:
the headrest attachment end of the primary arm having a third recess, the third recess having a V-shaped configuration, the third recess located adjacent the terminus of the headrest attachment end;
each mounting block slide locking bolt having a shaft and a head, each mounting block slide locking bolt being configured allow the shaft of the bolt to pass through the slot of the primary arm, thereby securing the mounting block within the second recess; and
the secondary arm front edge coupling bolts securing the primary arm and the secondary arm, with the mounting block being held within the third recess between the primary arm and the secondary arm.

7. The headrest camera mount as described in claim 6, with the headrest camera mount further comprising:
the primary arm being fabricated of a rigid material;
the mounting block being fabricated of a rigid material; and
the secondary arm being fabricated of a rigid material.

8. A headrest camera mount comprising several components, in combination:
a primary arm has a camera mount end and a headrest attachment end, the primary arm having a plurality of coupling bolt holes there through, the primary arm having a first recess and a second recess therein;
a mounting block having a top surface and a bottom surface and a rear edge and a front edge, the mounting block having a pair of threaded slide locking bolt holes there in, with each of the threaded slide locking bolt holes having an associated slide locking bolt, the mounting block being configured to fit within the second recess of the primary arm; and
a secondary arm having a second length and a second thickness and a first height, the secondary arm having an upper surface and a lower surface and an edge there between, the mounting block being held between the primary arm and the secondary arm.

9. The headrest camera mount as described in claim 8, with the headrest camera mount further comprising the primary end of the headrest camera mount having a camera coupling subassembly mounting bolt hole there through for receiving a camera coupling subassembly, the primary arm having a slot therein, the slot running from the front edge of the primary arm and through the primary arm to the second recess, the primary arm having a plurality of coupling bolt holes running from the front edge of the primary arm and through the primary arm to the first recess.

* * * * *